United States Patent [19]

Stewart, Jr.

[11] 4,349,420

[45] Sep. 14, 1982

[54] FRACTIONAL DISTILLATION PROCESS FOR THE PRODUCTION OF ALUMINUM CHLORIDE

[75] Inventor: Donald L. Stewart, Jr., Greensburg, Pa.

[73] Assignee: Aluminum Company of America, Pittsburgh, Pa.

[21] Appl. No.: 224,280

[22] Filed: Jan. 12, 1981

[51] Int. Cl.$^3$ .............................................. B01D 3/14
[52] U.S. Cl. .......................................... 203/75; 55/71;
55/72; 203/77; 203/78; 203/80; 203/82;
203/84; 423/135; 423/210; 423/463; 423/496
[58] Field of Search ...................... 55/71, 72; 423/135,
423/463, 495, 496, 210, 116, 123, 126, 133, 136,
141, 159, 163, 240, 341, 343, 466, 492, 493, 611,
612; 75/68 B, 68 R; 203/50, 28, 29, 31, 32, 42,
71, 73, 81, 78, 80, 77, 82, 84

[56] References Cited

U.S. PATENT DOCUMENTS

| | | | |
|---|---|---|---|
| 2,387,228 | 10/1945 | Arnold | 23/93 |
| 2,718,279 | 9/1955 | Kraus | 183/120 |
| 2,813,786 | 11/1957 | Milliken | 55/71 |
| 2,870,869 | 1/1959 | Mahler | 183/120 |
| 3,436,211 | 4/1969 | Dewing | 75/68 |
| 3,786,135 | 1/1974 | King et al. | 423/496 |
| 3,938,969 | 2/1976 | Sebenik et al. | 55/72 |
| 4,083,923 | 4/1978 | Lippman et al. | 55/72 |

Primary Examiner—Frank Sever
Attorney, Agent, or Firm—David J. Hill; Daniel A. Sullivan, Jr.

[57] ABSTRACT

Metal chlorides such as aluminum chloride ($AlCl_3$) are separated from a mixture containing metal chlorides including $AlCl_3$ and ferric chloride ($FeCl_3$). In order to effect this separation, the mixture is subjected to a fractional distillation process utilizing an array of distillation columns. According to this process, the mixture is introduced into a first distillation column which is operated at temperatures and pressures sufficient to separate $FeCl_3$ from the mixture while avoiding the formation of a solid solution of $FeCl_3$ and $AlCl_3$ within the column. At least one additional distillation column is then employed to separate metal chlorides from the remaining mixture from the first column.

11 Claims, 2 Drawing Figures

FRACTIONAL DISTILLATION PROCESS FOR THE PRODUCTION OF ALUMINUM CHLORIDE

BACKGROUND OF THE INVENTION

This invention relates to the production of metal chlorides such as $AlCl_3$. More particularly, this invention relates to a fractional distillation process for separating metal chlorides from a mixture containing metal chlorides including $AlCl_3$ and $FeCl_3$.

As used herein, in accordance with common trade practice, the term "metal chloride" includes silicon tetrachloride ($SiCl_4$).

In a process for the production of metal chlorides by the chlorination of a material containing metal oxides, a mixture of chlorides and non-condensable gases will be obtained. For example, in a process for the production of $AlCl_3$ by the chlorination of kaolin clay in the presence of a carbonaceous reducing agent, a mixture of metal chlorides, including $AlCl_3$, $FeCl_3$, $SiCl_4$ and titanium tetrachloride ($TiCl_4$), will be obtained. Also obtained will be various non-condensable gases (at the temperatures and pressures encountered in the chlorination system) such as nitrogen ($N_2$), carbon monoxide ($CO$), carbon dioxide ($CO_2$) and chlorine ($Cl_2$), chlorides such as hydrogen chloride ($HCl$) and phosgene ($COCl_2$), and small amounts of other metal chlorides such as calcium chloride ($CaCl_2$) and sodium chloride ($NaCl$).

Various processes for the separation of metal chlorides from a mixture of chlorides and non-condensable gases are known. Several of these processes involve the selective condensation or fractional distillation of particular metal chlorides from the mixture. Thus, for example, the commonly owned, copending application of Johnson, Stewart, Tsao and Wohleber, Ser. No. 40,945, entitled "Purification of Aluminum Chloride", describes a three-stage fractional distillation process for separating $AlCl_3$ from a mixture of chlorides and non-condensable gases. According to this process, the mixture is introduced into a first distillation column, which is operated at temperatures sufficient to separate $SiCl_4$ from the mixture. The undistilled chlorides from the first column are then introduced into a second distillation column, which is operated at temperatures sufficient to separate $TiCl_4$ from the remainder of the chlorides. A portion of the $TiCl_4$ separated by the second column is added to the first column or upstream thereof to prevent precipitation of $AlCl_3$ and to dissolve any solid $AlCl_3$ condensing in the first column. The undistilled chlorides from the second column are then introduced into a third column to distill $AlCl_3$ from the remaining chlorides (which include $FeCl_3$).

An alternative three-stage fractional distillation process is also disclosed in Application Ser. No. 40,945. In this alternative process, a mixture of chlorides and non-condensable gases is introduced into a first distillation column, which is operated so as to separate $SiCl_4$ and $TiCl_4$ from the mixture. The mixture of $SiCl_4$ and $TiCl_4$ from the first column is passed to a second distillation column, which is operated so as to separate the $SiCl_4$ from the $TiCl_4$. A portion of the $TiCl_4$ from this second column is returned to the first column to inhibit the accumulation of solid $AlCl_3$ therein. The undistilled chlorides from the first column are introduced into a third distillation column, which is operated so as to separate $AlCl_3$ from the other chlorides.

U.S. Pat. No. 2,387,228 to Arnold describes a two-stage fractional distillation process for the separation of $AlCl_3$ from a mixture containing $AlCl_3$, $FeCl_3$, $SiCl_4$ and $TiCl_4$. According to this process, the mixture is introduced into a first distillation column, which is operated at temperatures and pressures sufficient to separate a mixture of $AlCl_3$ and $FeCl_3$ in the liquid state from the remainder of the chlorides. This liquid mixture is then introduced into a second distillation column, which is operated at temperatures and pressures sufficient to separate $AlCl_3$ in the gaseous state from the mixture of liquids.

Other known processes for the fractional distillation or selective condensation of particular metal chlorides from a mixture of chlorides include that of U.S. Pat. No. 3,436,211 of Dewing and the process of U.S. Pat. No. 3,786,135 to King et al. The Dewing process operates to remove calcium chloride ($CaCl_2$) and magnesium chloride ($MgCl_2$) from a gaseous mixture containing these chlorides and $AlCl_3$, and the King et al. process operates to selectively condense sodium aluminum chloride ($NaAlCl_4$) from the gaseous effluent derived from the chlorination of alumina which is contaminated with sodium.

Unfortunately, however, problems have arisen in many instances where a fractional distillation or selective condensation procedure has been utilized to separate a particular constituent from a mixture of metal chlorides. Such problems may arise because the range of temperatures found in distillation columns operated at convenient pressures for the separation of particular metal chlorides from the mixture may include temperatures at which undesirable condensation of other metal chlorides takes place. Thus, for example, as described in the aforementioned application of Johnson et al., Ser. No. 40,945, now abandoned, the condensation of $AlCl_3$ from a gas to a solid may interfere with the operation of a distillation column at temperatures and pressures sufficient to separate $SiCl_4$ from a mixture containing $AlCl_3$, $FeCl_3$, $SiCl_4$ and $TiCl_4$. Such a column may be operated at a convenient pressure with a temperature at the bottom of the column higher than the melting point of the mixture at that pressure, and a temperature at the top of the column at or above the boiling point of $SiCl_4$ at that pressure. Thus, the range of temperatures within the column may include the sublimation temperature of $AlCl_3$; consequently, appreciable amounts of $AlCl_3$ may condense to a solid within the column and thereby clog or plug it. This plugging problem is solved by the method of Johnson et al., which provides for the maintenance of an amount of $TiCl_4$ sufficient to prevent solidification of $AlCl_3$ in any column which is operated to separate at least one metal chloride including $SiCl_4$ from a mixture containing $AlCl_3$ and other chlorides and which is operated at temperatures which include the sublimation point of $AlCl_3$ at the operating pressure of the column.

A similar problem is discussed in U.S. Pat. No. 2,718,279 of Kraus, which describes a fractional condensation process involving the separation of $FeCl_3$ from a mixture of gases including $FeCl_3$ and $TiCl_4$. According to this reference, fractional condensation of such a mixture is hindered by the tendency of $FeCl_3$ to condense or precipitate on the interior surfaces of conventional condensing apparatus which are operated at convenient temperatures and pressures for the separation of $TiCl_4$ from the mixture. According to the method of Kraus, this problem is overcome by the washing of the FeCl3 from the gaseous mixture with a continuous flow of liquid TiCl4.

U.S. Pat. No. 2,870,869 to Mahler describes a problem which has accompanied the separation of TiCl4 from a gaseous mixture containing TiCl4 and other metal chlorides, including AlCl3 and FeCl3. According to this reference, the condensation of TiCl4 from such a mixture may be accompanied by the formation of a considerable amount of finely divided solid particles of AlCl3 and FeCl3. According to the process of Mahler, this problem is solved by the provision of a chamber containing a slurry of solid AlCl3 and FeCl3 suspended in liquid TiCl4. This slurry is maintained at a temperature close to but below the dew point of TiCl4 and is agitated within the chamber so as to provide a turbulent shower therein. The gaseous mixture is then passed through the chamber and the gaseous AlCl3 and FeCl3 in the mixture are reportedly washed therefrom by contact with the turbulent shower.

Thus, it appears that considerable difficulties have been encountered in fractional distillation procedures for separating particular metal chlorides from a mixture containing various metal chlorides including AlCl3 and FeCl3. These problems have arisen because of the tendency of AlCl3 and FeCl3 to solidify in fractional distillation columns which are operated at temperatures and pressures which are suitable for the separation of particular metal chlorides from such mixtures. Various techniques aimed at removal or dissolution of the AlCl3 and/or FeCl3 by the addition of a wash medium or solvent to the mixture have been attempted. However, such procedures are often cumbersome and complicated and may involve the addition of specialized apparatus and piping.

It would be desirable if a fractional distillation process could be developed for separating particular metal chlorides from a mixture containing AlCl3 and FeCl3 which avoids the problem of clogging of distillation columns caused by the undesirable solidification or condensation of AlCl3 and FeCl3 and which further avoids the complicated washing techniques of known processes.

SUMMARY OF THE INVENTION

It is an object of the present invention to provide a fractional distillation process for the separation of particular metal chlorides from a mixture containing metal chlorides including AlCl3 and FeCl3 which avoids the problem of clogging of distillation columns caused by the undesirable solidification or condensation of AlCl3 and FeCl3. It is another object of this invention to provide such a process which does not require the addition of a wash medium or solvent to the mixture.

In accordance with these and other objects, the present invention provides a fractional distillation process for the separation of AlCl3 from a mixture containing AlCl3 and other metal chlorides including FeCl3. This separation is effected by introducing the mixture into a first distillation column which is operated at temperatures and pressures sufficient to separate FeCl3 from the mixture while avoiding the formation of a solid solution of FeCl3 and AlCl3 within the column, and then utilizing at least one additional distillation column to remove AlCl3 from the remaining mixture of chlorides from the first column.

In order to facilitate an understanding of the invention, its features are illustrated in the accompanying drawings and a detailed description thereof follows. It should be understood nevertheless that it is not intended that the invention be limited to the particular embodiments shown. Various changes and alterations are contemplated such as would ordinarily occur to one skilled in the art to which the invention relates.

DETAILED DESCRIPTION OF THE INVENTION

In a process for the production of metal chlorides by the chlorination of a material containing metal oxides, a mixture of chlorides and non-condensable gases will be obtained. The present invention may be utilized in the separation of particular metal chlorides from such a mixture.

Figure 1:
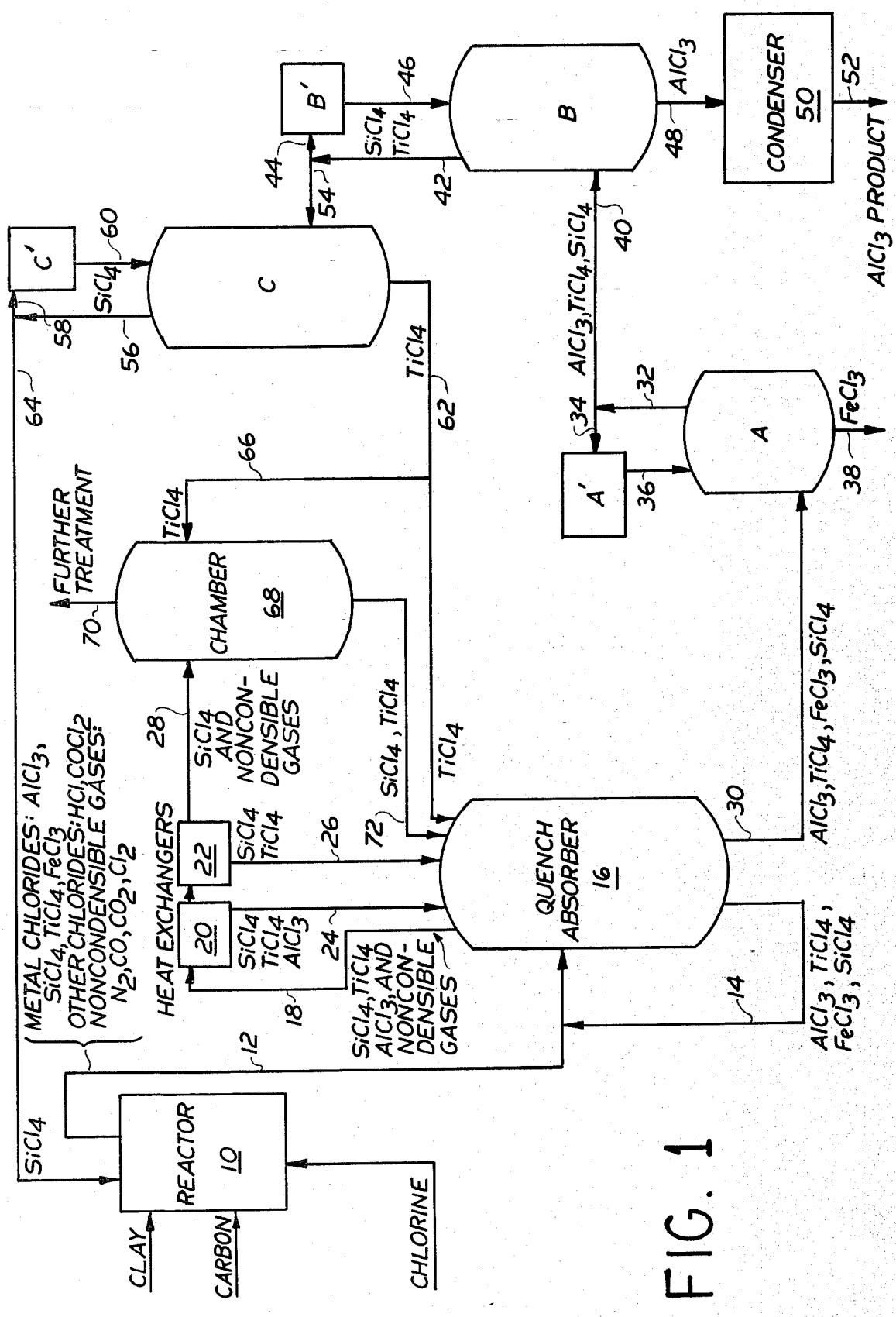
FIG. 1 is a schematic flow diagram generally illustrating the present invention as utilized in connection with the operation of an array of distillation columns in a clay chlorination process.

This invention may be particularly useful in connection with a process for the production of AlCl3 by the chlorination of a material containing aluminum oxide in the presence of a carbonaceous reducing agent. Such a process is illustrated in FIG. 1, wherein kaolin clay is utilized as the source of aluminum oxide. Although the illustrated process is typical of the processes in which the invention may be useful, the preferred process conditions which are recited in connection with the description of the illustrated process are not properly considered to be limitations of the scope of the invention. As shown in FIG. 1, clay is charged to reactor 10, along with a carbon reductant, for reaction therein with chlorine gas, under conditions well known to those skilled in the art. The product of this reaction is a mixture of gaseous metal chlorides and non-condensable gases. This mixture typically includes gaseous metal chlorides in the following amounts:

| Metal Chloride | Percentage by Weight |
|---|---|
| AlCl3 | 30–35 |
| SiCl4 | 10–15 |
| TiCl4 | 1–2 |
| FeCl3 | 1–2 |
| CaCl2 | trace |
| NaCl | trace |

The product of the chlorination reactor also includes other chlorides such as HCl and COCl2, and non-condensable gases such as N2, CO, CO2 and Cl2, which constitute the major portion of the balance of the gaseous mixture.

In the process illustrated in FIG. 1, the gaseous mixture passes from reactor 10 through line 12 to quench absorber 16. Before the mixture reaches the quench absorber, however, it is cooled by the introduction thereinto of a recycle stream of metal chlorides which is passed out of quench absorber 16 through line 14. The introduction of this recycle stream typically reduces the temperature of the mixture in line 12 from about 600° C. at the reactor outlet to about 325° C. at the entrance of quench absorber 16. It will be apparent to those skilled in the art that the cooled mixture may also be passed through dust collectors, cyclones or the like (not shown) for cleaning purposes.

Cooling of the mixture to about 325° C. does not condense the gaseous chlorides of silicon, titanium, aluminum and iron.

The following table sets forth the melting and boiling temperatures for the pertinent metal chlorides:

| Metal Chloride | °C. at One Atmosphere Presssure | |
| --- | --- | --- |
| | Melting Point | Boiling Point |
| $SiCl_4$ | −70 | 57.6 |
| $TiCl_4$ | −30 | 136.4 |
| $AlCl_3$ | * | * |
| $FeCl_3$ | 282 | 315 |
| NaCl | 804 | 1413 |
| $CaCl_2$ | 772 | >1600 |

*$AlCl_3$ sublimes at a temperature of approximately 183° C. at a pressure of one atmosphere and melts at about 193° C. at a pressure of 2.3 atmospheres.

Quench absorber 16 is maintained with a top temperature of about 100° C. and a bottom temperature within the range of 165°-185° C. Under these conditions, the non-condensable gases and the more volatile metal chlorides such as $AlCl_3$, $SiCl_4$ and $TiCl_4$ are removed from the quench absorber in the form of a gas through line 18. It will be understood by those skilled in the art that the less volatile metal chlorides such as $FeCl_3$, $CaCl_2$ and NaCl, remain in the liquid state in the quench absorber, and thus do not pass therefrom with the gaseous mixture through line 18. As shown in FIG. 1, the gaseous mixture of non-condensable gases and volatile metal chlorides passes from the quench absorber through line 18 to heat exchangers 20 and 22. Heat exchanger 20 is maintained at a temperature of about 60° C., which is sufficient to condense the majority of the metal chlorides in the mixture from line 18. This condensate from heat exchanger 20 is returned to quench absorber 16 through line 24. The gaseous mixture in heat exchanger 20 is passed on to heat exchanger 22. This second heat exchanger is maintained at a temperature of about −15° C., which is sufficient to condense essentially all of the remaining $TiCl_4$ and a portion of the remaining $SiCl_4$ in the mixture from heat exchanger 20. This condensate is returned to quench absorber 16 through line 26. Thus, this arrangement of the quench absorber and the heat exchangers serves to remove the non-condensable gases from the cooled mixture from the reactor and to liquify the metal chlorides for removal to distillation column A. The remaining gaseous $SiCl_4$ and the non-condensable gases from heat exchanger 22 are passed into chamber 68 through line 28. This chamber and its use are more particularly described in the copending, commonly owned patent application of Bush and Stewart, Ser. No. 40,938, entitled "Method of Removing a Low Boiling Point Metal Chloride from a Gaseous Stream".

The condensed metal chlorides from quench absorber 16 are passed from the bottom thereof through line 30 to first distillation column A. This distillation column is of the conventional type, having a reboiler, an associated refluxing means and condenser, and sufficient plates or packing to effect the desired separation. As illustrated in FIG. 1, column A is operated at temperatures and pressures sufficient to separate $FeCl_3$ from the mixture while avoiding the formation of a solid solution of $FeCl_3$ and $AlCl_3$ within the column. It has been observed that a solid solution of $AlCl_3$ and $FeCl_3$ having a molar ratio ($AlCl_3$/$FeCl_3$) within the range of 0.66–1.00 and having a melting point higher than that of the liquid mixture entering the column from line 30 may be formed at locations in the column below the entry point of the mixture when the operating pressure of the column is less than about 40 psig. Consequently, preferred results may be achieved when column A is operated at a pressure of at least 50 psig and at a temperature at the top of the column within the range of 165°-185° C. and a temperature at the bottom of the column within the range of 340°-360° C. By operating column A in this manner, $FeCl_3$, NaCl, $CaCl_2$ and a small amount of $AlCl_3$ will be separated as a bottom liquid product, and the remaining mixture containing $SiCl_4$, $TiCl_4$ and the major portion of the $AlCl_3$ will be removed from column A in the form of a gas through line 32. A portion of this gaseous mixture is passed to condenser A' through line 34. The condensed mixture from condenser A' is returned to column A as reflux through line 36. The remaining gaseous mixture from column A is passed through line 40 to column B.

According to the preferred process scheme illustrated in FIG. 1, column B is operated at temperatures and pressures sufficient to separate $AlCl_3$ from the mixture received from column A. Preferred results may be achieved when column B is operated at a pressure of at least 30 psig but not greater than the pressure at which column A is operated, and at a temperature at the top of the column within the range of 140°-160° C. and a temperature at the bottom of the column within the range of 200°-220° C. By operating column B in this manner, $AlCl_3$ will be separated as a bottom liquid product, and the remaining mixture containing $SiCl_4$ and $TiCl_4$ will be removed from column B in the form of a gas through line 42. The separated $AlCl_3$ may be removed from the column through line 48 to condenser 50, where it is converted to solid form. Solid $AlCl_3$ product may then be removed from the system through line 52.

A portion of the gaseous mixture from column B, containing $SiCl_4$ and $TiCl_4$, is passed to condenser B' through lines 42 and 44. The condensed mixture from condenser B' is returned to column B as reflux through line 46. The remaining gaseous mixture from column B is passed through line 54 to column C.

According to the preferred process scheme illustrated in FIG. 1, column C is operated at temperatures and pressures sufficient to separate $SiCl_4$ from the mixture received from column B. Preferred results may be achieved when column C is operated at a pressure of at least 15 psig but not greater than the pressure at which column A is operated, and at a temperature at the top of the column within the range of 60°-80° C. and a temperature at the bottom of the column within the range of 140°-160° C. By operating column C in this manner, $TiCl_4$ will be separated as a bottom liquid product and $SiCl_4$ will be separated as a gas through line 56. The $TiCl_4$ is removed from column B through line 62 and recycled to quench absorber 16 or to chamber 68 through line 66. In the chamber, the $TiCl_4$ acts as a solvent for the gaseous $SiCl_4$ therein, as is more particularly described in the aforementioned application of Bush et al., Ser. No. 40,938.

A portion of the gaseous $SiCl_4$ from column C is passed to condenser C' through line 58. The condensed $SiCl_4$ from condenser C' is returned to column C as reflux through line 60. The remaining $SiCl_4$ from column C is recycled to reactor 10 through line 64, because the presence of $SiCl_4$ in the chlorination reactor inhibits the chlorination of silicon dioxide and, hence, the production of $SiCl_4$, in the reactor.

Figure 2:
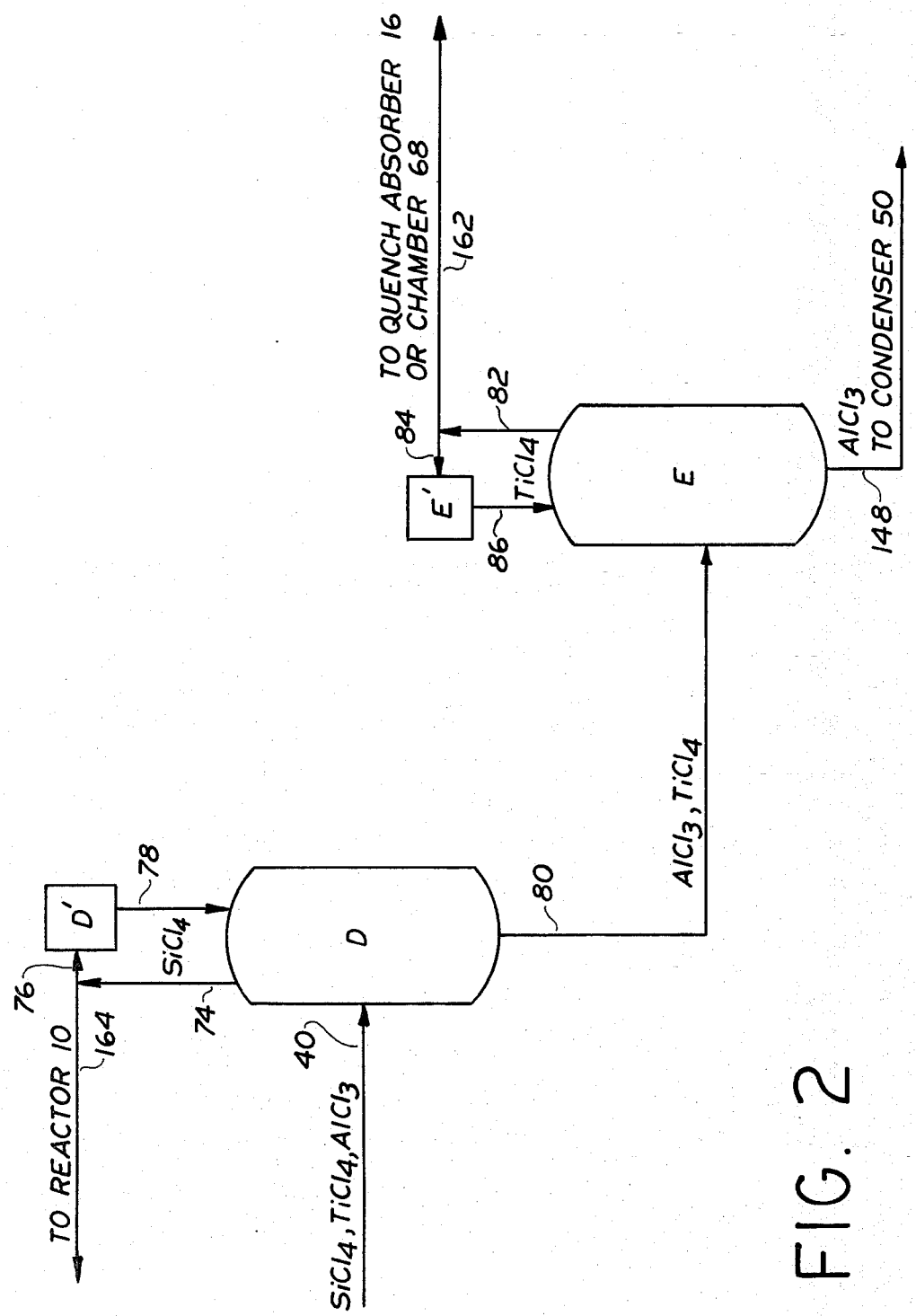
FIG. 2 is a schematic flow diagram generally illustrating an alternative array of distillation columns which may be utilized in place of a portion of the array of columns shown in FIG. 1.

An alternative array of distillation columns which may be utilized in place of a portion of the array of columns shown in FIG. 1 is illustrated in FIG. 2. This array may be interchanged with the portion of the array of FIG. 1 comprising columns B and C. Thus, when the process scheme illustrated in FIG. 2 is utilized, the mixture of $AlCl_3$, $SiCl_4$ and $TiCl_4$ from column A is passed through line 40 to column D. When the process scheme of FIG. 2 is utilized, however, it has been found that preferred results may be obtained when column A is operated at a pressure of at least 80 psig and at a temperature at the top of the column within the range of 220°–240° C. and a temperature at the bottom of the column within the range of 370°–390° C.

Column D is operated at temperatures and pressures sufficient to separate a mixture of $AlCl_3$ and $TiCl_4$ from the mixture received from column A. Preferred results may be obtained when column D is operated at a pressure of at least 75 psig but not greater than the pressure at which column A is operated, and at a temperature at the top of the column within the range of 130°–150° C. and a temperature at the bottom of the column within the range of 240°–260° C. By operating column D in this manner, a mixture of $AlCl_3$ and $TiCl_4$ will be separated as a bottom liquid product and $SiCl_4$ will be separated as a gas through line 74. A portion of this gaseous $SiCl_4$ is passed to condenser D' through line 76. The condensed $SiCl_4$ from condenser D' is returned to column D as reflux through line 78. The remaining $SiCl_4$ from column D is recycled to reactor 10 through line 164.

The liquid mixture of $AlCl_3$ and $TiCl_4$ from column D is passed therefrom through line 80 to column E. Column E is operated at temperatures and pressures sufficient to separate $AlCl_3$ from the mixture received from column D. Preferred results may be obtained when column E is operated at a pressure of at least 30 psig but not greater than the pressure at which column A is operated, and at a temperature at the top of the column within the range of 160°–180° C. and a temperature at the bottom of the column within the range of 210°–230° C. By operating column E in this manner, liquid $AlCl_3$ will be removed from the bottom of the column and passed to condenser 50 through line 148. Gaseous $TiCl_4$ will be removed from column E through line 82. A portion of this gaseous $TiCl_4$ is passed to condenser E' through line 84. The condensed $TiCl_4$ from condenser E' is returned to column E as reflux through line 86. The remaining $TiCl_4$ from column E is recycled through line 162 to quench absorber 16 or to chamber 68.

The operation of the present invention in accordance with either of the preferred process schemes that have been discussed reduces the need for high-temperature molten chloride pumps in the system. In fact, such pumps may be eliminated entirely between the distillation columns whenever $FeCl_3$ is removed from the mixture in the first column and the columns are operated at temperatures and pressures sufficient to transfer material between the columns in the gaseous state. In addition, by removing $FeCl_3$ from the mixture of chlorides in the first distillation column of the array, operation according to the process of this invention lowers the pressures and temperatures at which subsequent columns in the array are operated below the ranges of pressures and temperatures typically encountered in fractional distillation columns utilized in known processes. Because the environment in these columns is therefore less harsh than is typically encountered in such columns, less expensive materials may be utilized in the construction thereof.

It should be understood that this description of the present invention is susceptible to various modifications, changes and adaptations, and that the same are intended to be encompassed within the meaning and range of equivalents of the appended claims.

What is claimed is:

1. A process for the separation of $AlCl_3$ from a mixture containing $AlCl_3$, $SiCl_4$, $TiCl_4$, $FeCl_3$ and no substantial amounts of other metal chlorides by fractional distillation utilizing an array of distillation columns, said process comprising:
   (a) introducing the mixture into a first distillation column operated at temperatures and pressures sufficient to separate from the mixture within the column $FeCL_3$ as a liquid and $ALCL_3$, $SiCL_4$ and $TiCL_4$ as gas, while avoiding the formation of a solid solution of $FeCl_3$ and $AlCl_3$ which would otherwise clog the column; and
   (b) utilizing at least one additional distillation column to remove liquid $AlCl_3$ from the remaining mixture of chlorides from the first column.

2. The process of claim 1 wherein any additional distillation columns utilized after said first distillation column are operated at pressures no greater than the pressure at which said first column is operated.

3. The process of claim 1 wherein the mixture is derived from the chlorination of a material containing aluminum oxide.

4. A process as claimed in claim 1 wherein the utilizing of at least one additional column comprises:
   (a) introducing the remaining mixture from the first distillation column, containing $AlCl_3$, $SiCl_4$ and $TiCl_4$, into a second distillation column operated at temperatures and pressures sufficient to separate a mixture of $AlCl_3$ and $TiCl_4$ from the mixture from the first distillation column; and
   (b) introducing the mixture of $AlCl_3$ and $TiCl_4$ from the second distillation column into a third distillation column operated at temperatures and pressures sufficient to separate liquid $AlCl_3$ from the mixture from the second column.

5. The process of claim 4 wherein the first distillation column is operated at a pressure of at least 80 psig and at a temperature at the top of the column within the range of 220°–240° C. and a temperature at the bottom of the column within the range of 370°–390° C.

6. The process of claim 4 wherein the second distillation column is operated at a pressure of at least 75 psig but not greater than the pressure at which the first column is operated, and at a temperature at the top of the column within the range of 130°–150° C. and a temperature at the bottom of the column within the range of 240°–260° C.

7. The process of claim 4 wherein the third distillation column is operated at a pressure of at least 30 psig but not greater than the pressure at which the first column is operated, and at a temperature at the top of the column within the range of 160°–180° C. and a temperature at the bottom of the column within the range of 210°–230° C.

8. A process for the separation of $AlCl_3$ and $SiCl_4$ from a mixture containing $AlCl_3$, $FeCl_3$, $SiCl_4$, $TiCl_4$ and no substantial amounts of other metal chlorides by fractional distillation utilizing an array of distillation columns, said process comprising:

(a) introducing the mixture into a first distillation column operated at temperatures and pressures sufficient to separate from the mixture within the column $FeCl_3$ as a liquid and $AlCl_3$, $SiCl_4$ and $TiCl_4$ as gas, while avoiding the formation of a solid solution of $FeCl_3$ and $AlCl_3$ which would otherwise clog the column;

(b) introducing the remaining mixture from the first distillation column, containing $AlCl_3$, $SiCl_4$ and $TiCl_4$, into a second distillation column operated at temperatures and pressures sufficient to separate liquid $AlCl_3$ from the mixture from the first distillation column; and (c) introducing the remaining mixture from the second distillation column, containing $SiCl_4$ and $TiCl_4$, into a third distillation column operated at temperatures and pressures sufficient to separate $SiCl_4$ from the mixture from the second distillation column.

9. The process of claim 8 wherein the first distillation column is operated at a pressure of at least 50 psig and at a temperature at the top of the column within the range of 165°–185° C. and a temperature at the bottom of the column within the range of 340°–360° C.

10. The process of claim 8 wherein the second distillation column is operated at a pressure of at least 30 psig but not greater than the pressure at which the first column is operated, and at a temperature at the top of the column within the range of 140°–160° C. and a temperature at the bottom of the column within the range of 200°–220° C.

11. The process of claim 8 wherein the third distillation column is operated at a pressure of at least 15 psig but not greater than the pressure at which the first column is operated, and at a temperature at the top of the column within the range of 60°–80° C. and a temperature at the bottom of the column within the range of 140°–160° C.

* * * * *